United States Patent
Nozaki et al.

(10) Patent No.: US 11,548,534 B2
(45) Date of Patent: Jan. 10, 2023

(54) VEHICLE AND REMOTE OPERATION SYSTEM

(71) Applicants: TOYOTA JIDOSHA KABUSHIKI KAISHA, Toyota (JP); DENSO CORPORATION, Kariya (JP)

(72) Inventors: Yosuke Nozaki, Toyota (JP); Tatsuya Matsunami, Nisshin (JP); Takashi Hayashi, Aichi-gun (JP); Tomoya Makino, Kariya (JP); Yohei Tanigawa, Toyota (JP)

(73) Assignees: TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 194 days.

(21) Appl. No.: 17/034,655

(22) Filed: Sep. 28, 2020

(65) Prior Publication Data
US 2021/0107526 A1    Apr. 15, 2021

(30) Foreign Application Priority Data
Oct. 15, 2019    (JP) .............................. JP2019-188831

(51) Int. Cl.
*B60W 60/00*    (2020.01)
*B60W 40/09*    (2012.01)
(Continued)

(52) U.S. Cl.
CPC ......... *B60W 60/0051* (2020.02); *B60K 35/00* (2013.01); *B60W 40/09* (2013.01);
(Continued)

(58) Field of Classification Search
None
See application file for complete search history.

(56) References Cited

U.S. PATENT DOCUMENTS

2014/0156133 A1* 6/2014 Cullinane .............. B60K 37/06
701/23
2016/0362116 A1* 12/2016 Otsuka ................. G05D 1/0061
(Continued)

FOREIGN PATENT DOCUMENTS

JP    2017-163253 A    9/2017

*Primary Examiner* — James J Lee
*Assistant Examiner* — Andrew Sang Kim
(74) *Attorney, Agent, or Firm* — Oliff PLC

(57) ABSTRACT

A vehicle includes: a permission unit configured to permit a remote operation performed by a remote operation device provided outside the vehicle; a transmission unit configured to transmit surrounding information of the vehicle; a reception unit configured to receive a remote operation signal input by an operator outside the vehicle via the remote operation device; a traveling control unit configured to control the vehicle to travel based on the remote operation signal; a drive data acquisition unit configured to acquire drive data input by a driver in the vehicle; and a handover determination unit configured to determine, while the remote operation is permitted by the permission unit, that handover of a driving operation of the vehicle to the remote operation is allowed when a difference between the drive data acquired by the drive data acquisition unit and the remote operation signal is within a predetermined range.

15 Claims, 6 Drawing Sheets

(51) Int. Cl.
*B60K 35/00* (2006.01)
*B60W 50/14* (2020.01)

(52) U.S. Cl.
CPC ........ *B60W 50/14* (2013.01); *B60W 60/0057* (2020.02); *B60W 60/0059* (2020.02); *B60K 2370/152* (2019.05); *B60K 2370/167* (2019.05); *B60K 2370/175* (2019.05); *B60W 2540/30* (2013.01)

(56) References Cited

U.S. PATENT DOCUMENTS

| | | | |
|---|---|---|---|
| 2018/0284759 A1* | 10/2018 | Michalakis | B60W 50/0097 |
| 2019/0265710 A1* | 8/2019 | Kaneko | G08G 1/16 |
| 2019/0339696 A1* | 11/2019 | Mori | B60W 50/082 |

* cited by examiner

VEHICLE AND REMOTE OPERATION SYSTEM

INCORPORATION BY REFERENCE

The disclosure of Japanese Patent Application No. 2019-188831 filed on Oct. 15, 2019, including the specification, drawings and abstract is incorporated herein by reference in its entirety.

BACKGROUND

1. Technical Field

The present disclosure relates to a vehicle and a remote operation system.

2. Description of Related Art

Japanese Unexamined Patent Application Publication No. 2017-163253 (JP 2017-163253 A) discloses a remote operation system for replacing an operator who performs a remote operation of a vehicle under a predetermined condition such as when the vehicle is stopped.

SUMMARY

However, the remote operation system above does not take into account handover of driving operations from a driver in the vehicle to an operator outside the vehicle. Therefore, there is a demand for a vehicle that allows handover of driving operations from the driver to the operator while the vehicle is traveling.

The present disclosure provides a vehicle and a remote operation system that allow the driver in the vehicle to hand over the driving operations to the operator outside the vehicle while the vehicle is traveling.

A vehicle according to a first aspect of the present disclosure includes a permission unit configured to permit a remote operation performed by a remote operation device provided outside the vehicle, a transmission unit configured to transmit surrounding information of the vehicle that is acquired by at least one sensing device to the remote operation device, a reception unit configured to receive a remote operation signal input by an operator outside the vehicle via the remote operation device, a traveling control unit configured to control the vehicle to travel based on the remote operation signal, a drive data acquisition unit configured to acquire drive data input by a driver in the vehicle, and a handover determination unit configured to determine, while the remote operation is permitted by the permission unit, that handover of a driving operation of the vehicle to the remote operation is allowed when a difference between the drive data acquired by the drive data acquisition unit and the remote operation signal is within a predetermined range.

A vehicle according to a second aspect of the present disclosure includes a processor configured to: permit a remote operation by a remote operation device provided outside the vehicle; transmit, to the remote operation device, surrounding information of the vehicle acquired by at least one sensing device; receive a remote operation signal input by an operator outside the vehicle via the remote operation device; control the vehicle to travel based on the remote operation signal; acquire drive data input by a driver in the vehicle; and determine, while the remote operation is permitted, that handover of a driving operation of the vehicle to the remote operation is allowed when a difference between the drive data acquired by the processor and the remote operation signal is within a predetermined range.

A remote operation system according to a third aspect of the present disclosure includes the vehicle according to the first aspect, and a remote operation device that is provided outside the vehicle and is configured to remotely control the vehicle.

As described above, with the vehicle according to the first aspect of the present disclosure and the remote operation system according to the second aspect of the present disclosure, the driving operation can be handed over from the driver in the vehicle to the operator outside the vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
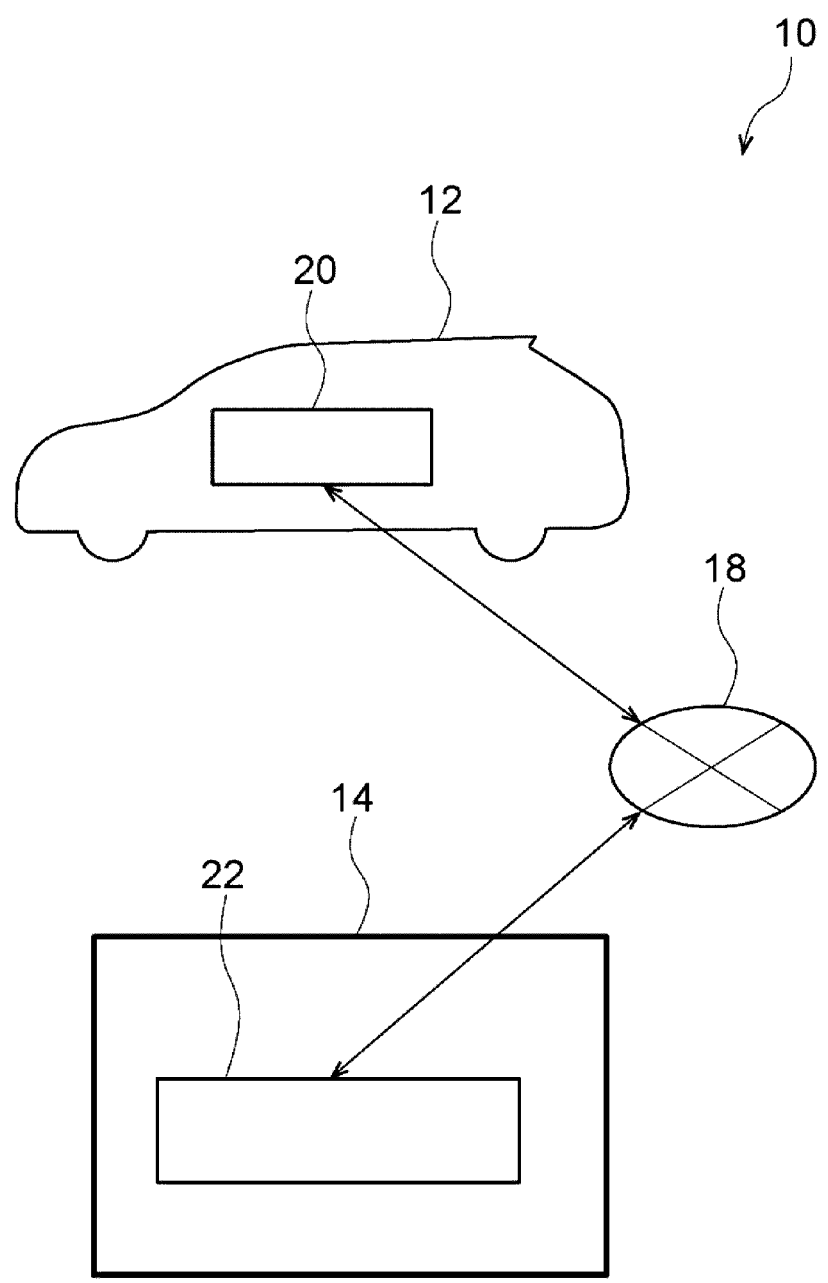
FIG. 1 is a diagram of a schematic configuration of a remote operation system according an embodiment.

A remote operation system 10 according to an embodiment will be described with reference to the drawings. The dimensional ratio in the drawings is exaggerated for convenience of explanation, and may differ from the actual dimensional ratio.

As shown in FIG. 1, the remote operation system 10 is configured to include a vehicle 12 and a remote operation device 14. Further, the vehicle 12 and the remote operation device 14 are connected to each other via a predetermined network 18.

The vehicle 12 of the embodiment includes a traveling control unit 20. Further, the vehicle 12 is configured such that a mode is switchable between a manual operation mode and a remote operation mode. In the manual operation mode, an occupant (driver) of the vehicle 12 operates the vehicle 12 to travel. On the other hand, in the remote operation mode, the traveling control unit 20 controls the vehicle 12 to travel based on remote operation signals input from the remote operation device 14.

The remote operation device 14 is provided outside the vehicle 12, and is configured to transmit the remote operation signals that are input by an operator to the vehicle 12 via the network 18. Further, the remote operation device 14 includes a control unit 22. The remote operation device 14 includes an input device 68 with which the operator inputs the remote operation signals (refer to FIG. 3).

Hardware Configuration of Vehicle 12

Figure 2:
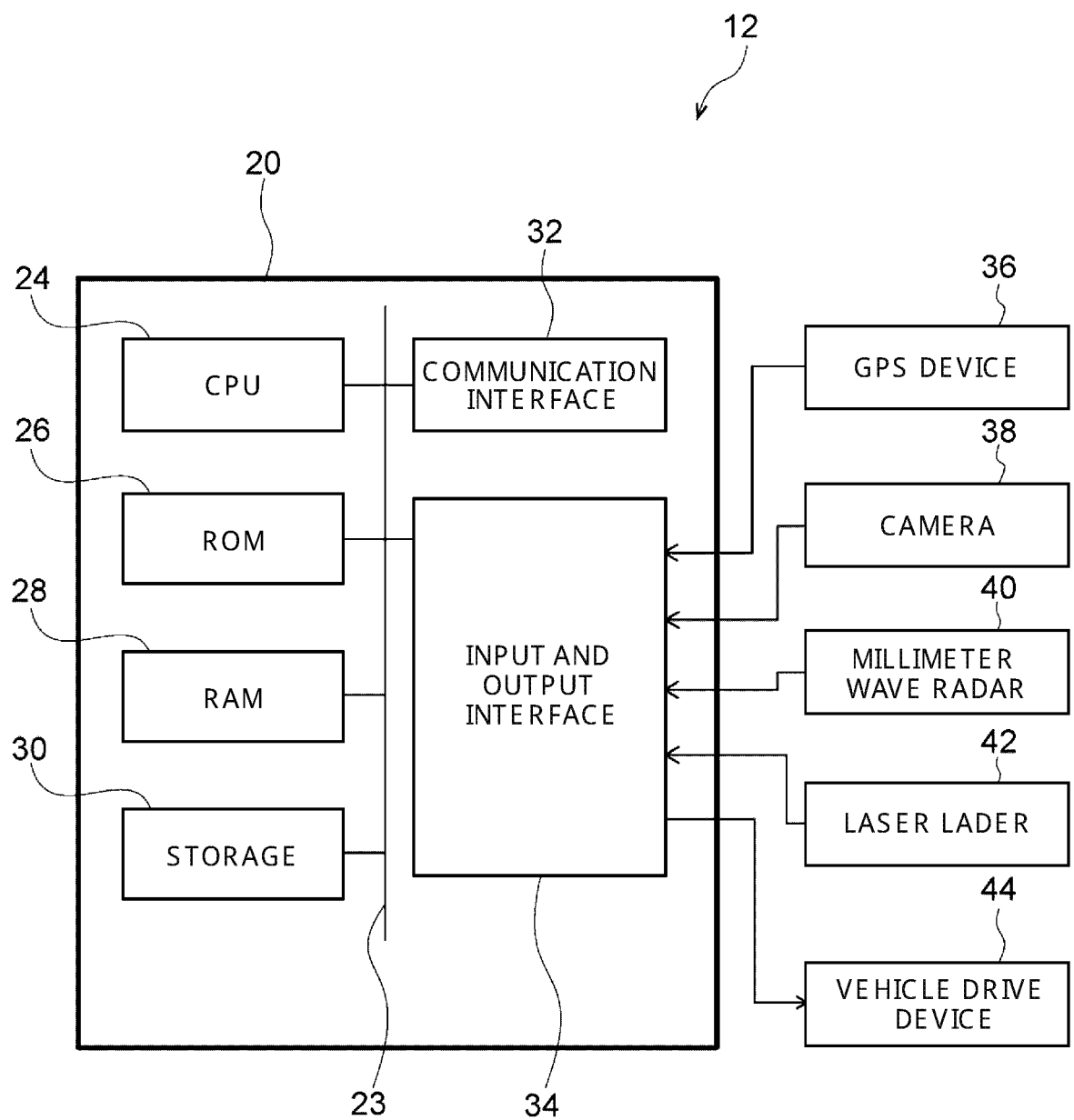
FIG. 2 is a block diagram showing a hardware configuration of a vehicle.

FIG. 2 is a block diagram showing a hardware configuration of the vehicle 12. As shown in FIG. 2, the traveling control unit 20 of the vehicle 12 is configured to include a central processing unit (CPU: processor) 24, a read only memory (ROM) 26, a random access memory (RAM) 28, a storage 30, a communication interface 32, and an input and output interface 34. Each of the components are connected to each other via a bus 23 so as to be mutually communicable.

The CPU 24 is a central processing unit, and executes various programs and controls each of the components. That is, the CPU 24 reads out the program from the ROM 26 or the storage 30, and executes the program with the RAM 28 as a workspace. The CPU 24 controls each of the components above and performs various calculation processes in accordance with the program stored in the ROM 26 and the storage 30.

The ROM 26 stores various programs and various types of data. The RAM 28 as a workspace temporarily stores the program or the data. The storage 30 is configured of a hard disk drive (HDD) or a solid state drive (SSD), and stores various programs, including an operating system, and various types of data. In the embodiment, the ROM 26 or the storage 30 includes a remote operation program for controlling the vehicle 12 to travel by a remote operation and a handover program for handing over a driving operation of the vehicle 12 to the remote operation.

The communication interface 32 is an interface for the vehicle 12 to communicate with the remote operation device 14, a server, and other devices, and Ethernet (registered trademark), fiber distributed data interface (FDDI), or Wi-Fi (registered trademark), for example, is used as the communication standard.

The input and output interface 34 is connected to a global positioning system (GPS) device 36, a camera 38, a millimeter wave radar 40, a laser radar 42, and a vehicle driving device 44. The GPS device 36 receives GPS signals from a plurality of GPS satellites and measures the position of its own vehicle. The positioning accuracy of the GPS device 36 is improved as the number of receivable GPS signals increases.

The camera 38 is disposed facing the driver in a vehicle cabin and captures an image of the driver. Specifically, the camera 38 is configured to capture an image of a face of the driver.

The millimeter wave radar 40 measures reflected waves of emitted radio waves to detect obstacles around the vehicle 12. The laser radar 42 scans a laser light and measures reflected light to detect obstacles around the vehicle 12.

The vehicle driving device 44 drives the vehicle 12 based on a signal input by the occupant or the operator. That is, the vehicle driving device 44 includes a steering actuator, an accelerator actuator, and a brake actuator.

Hardware Configuration of Remote Operation Device 14

Figure 3:
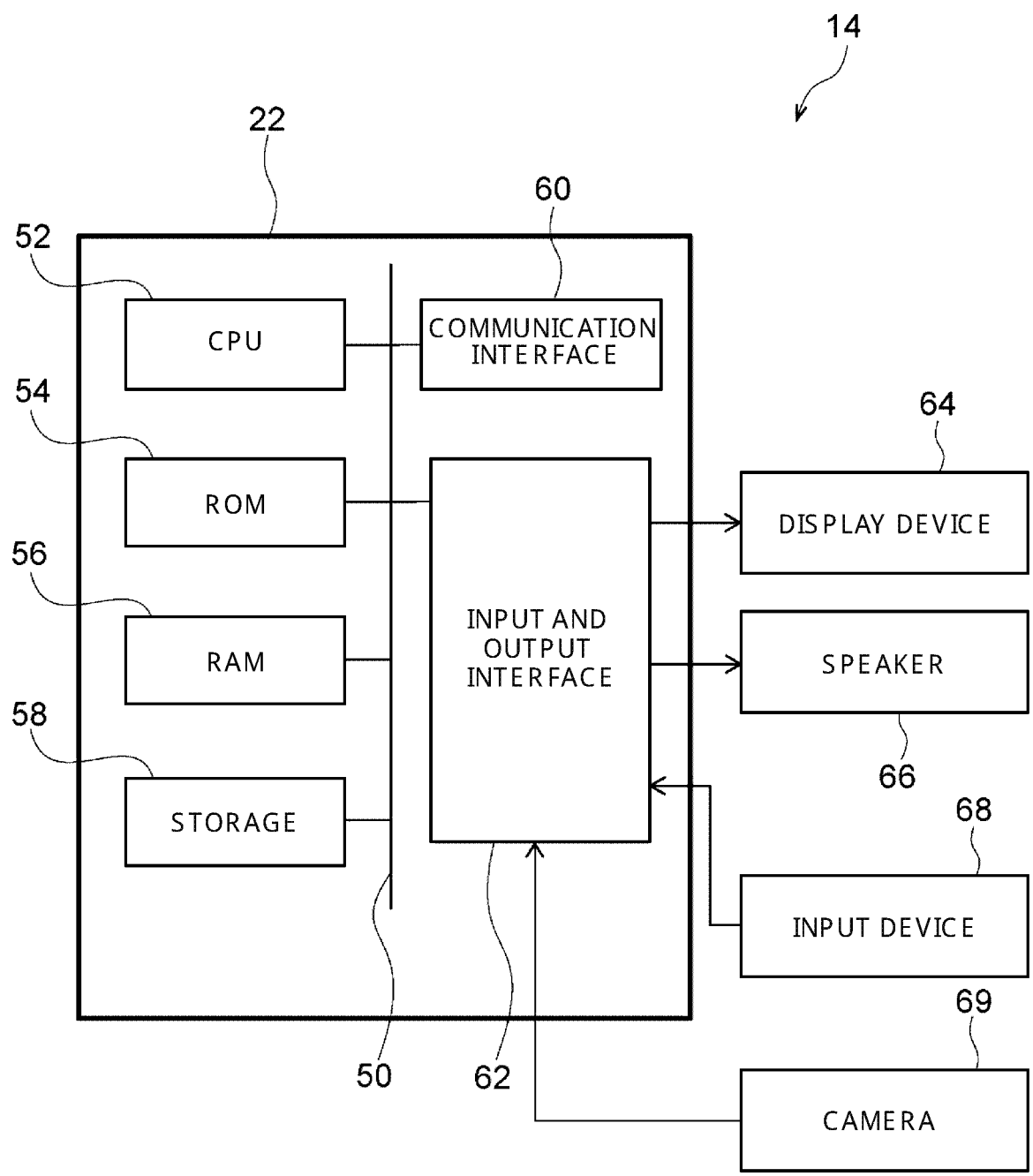
FIG. 3 is a block diagram showing a hardware configuration of a remote operation device.

FIG. 3 is a block diagram showing the hardware configuration of the remote operation device 14. As shown in FIG. 3, the control unit 22 of the remote operation device 14 is configured to include a CPU 52, a ROM 54, a RAM 56, a storage 58, a communication interface 60, and an input and output interface 62. Each of the components are connected to each other via a bus 50 so as to be mutually communicable.

The CPU 52 is a central processing unit, and executes various programs and controls each of the components. That is, the CPU 52 reads out the program from the ROM 54 or the storage 58, and executes the program with the RAM 56 as a workspace. The CPU 52 controls each of the components above and performs various calculation processes in accordance with the program stored in the ROM 54 or the storage 58.

The ROM 54 stores various programs and various types of data. The RAM 56 as a workspace temporarily stores the program or the data. The storage 58 is configured of a hard disk drive (HDD) or a solid state drive (SSD), and stores various programs, including an operating system, and various types of data.

The communication interface 60 is an interface for the vehicle 12 to communicate with the remote operation device 14, the server, and other devices, and Ethernet (registered trademark), fiber distributed data interface (FDDI), or Wi-Fi (registered trademark), for example, is used as the communication standard.

A display device 64, a speaker 66, an input device 68, and a camera 69 are connected to the input and output interface 62. The display device 64 is a device that displays surrounding images of the vehicle 12 and information on meters and gauges of the vehicle 12 for the operator, and is configured to include a monitor, etc. The display device 64 may be configured to include a plurality of monitors.

The speaker 66 is a device for outputting a voice to the operator, and is used to talk with the occupant in the vehicle 12, for example. The input device 68 is a device for the operator to input the remote operation signals to the remote operation device 14. As the input device 68, for example, an input device imitating a cockpit of the vehicle 12 can be used. In this case, the operator can perform the remote operation with a sense of driving similar to the sense of driving of an actual vehicle.

Further, as other input devices, a controller that can be held by the operator and is equipped with a plurality of buttons may be used. The controller above may have a shape imitating a controller used for a computer game, etc. In this case, even the operator who has a difficulty with legs can remotely operate the vehicle 12.

The camera 69 is disposed facing toward the operator and captures images of the operator. Specifically, the camera 69 is configured to capture an image of the face of the operator.

Functional Configurations of Vehicle 12

The vehicle 12 that constitutes the remote operation system 10 realizes various functions using the hardware resources as described above. Functional configurations realized by the vehicle 12 will be described with reference to FIG. 4.

Figure 4:
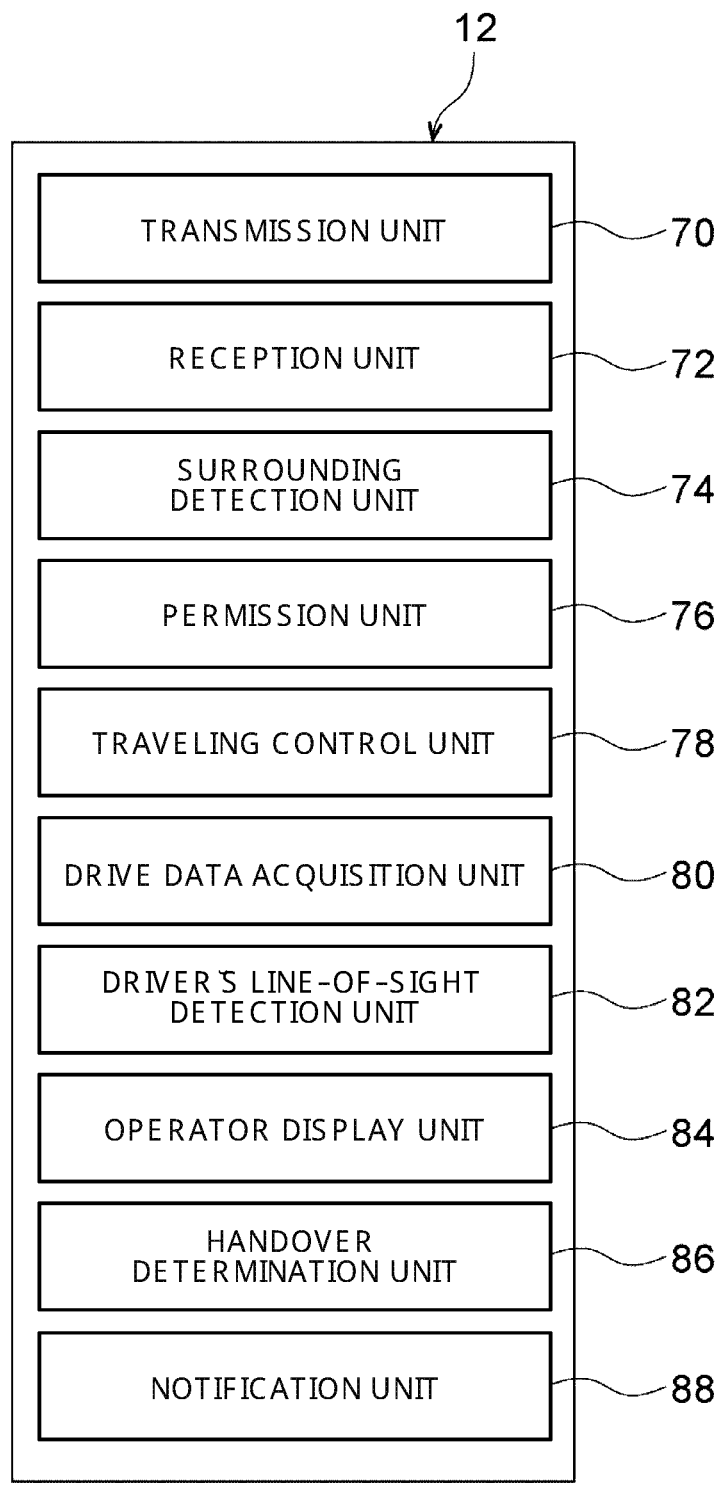
FIG. 4 is a block diagram showing an example of a functional configuration of the vehicle.

As shown in FIG. 4, the vehicle 12 is configured to include, as a functional configuration, a transmission unit 70, a reception unit 72, a surrounding detection unit 74, a permission unit 76, a traveling control unit 78, a drive data acquisition unit 80, a driver's line-of-sight detection unit 82, an operator display unit 84, a handover determination unit 86, and a notification unit 88. Each of the functional configurations is realized by the CPU 24 reading out and executing the program stored in the ROM 26 or the storage 30.

The transmission unit 70 transmits, to the remote operation device 14, surrounding information of the vehicle 12 obtained from a sensing device such as the millimeter wave radar 40 and the laser radar 42, and information on the driver's line of sight detected by the driver's line-of-sight detection unit 82 to be described later. In addition to the above, the transmission unit 70 may transmit information such as a vehicle speed, a current position, a planned driving route, to the remote operation device 14.

The reception unit 72 receives the remote operation signals that are input to the input device 68 by the operator via the remote operation device 14. The remote operation signals of the embodiment are signals including, for example, data relating to acceleration and deceleration input to the remote operation device 14, data relating to steering input to the remote operation device 14, and line-of-sight information of the operator.

The surrounding detection unit 74 detects surrounding information of the vehicle 12 based on information acquired from the sensing device such as the millimeter wave radar 40 and the laser radar 42. The permission unit 76 permits the remote operation performed by the remote operation device 14 outside the vehicle when a predetermined condition is satisfied.

The traveling control unit 78 causes the vehicle 12 to travel based on the remote operation signals received by the reception unit 72. In other words, the vehicle 12 is caused to travel by controlling the vehicle driving device 44 based on the remote operation signals.

The drive data acquisition unit 80 acquires drive data input by the driver in the vehicle. The drive data according to the embodiment is data including, for example, data relating to acceleration and deceleration of the vehicle 12, data relating to steering, and line-of-sight information of the driver. As the data relating to acceleration and deceleration of the vehicle 12, data relating to a depression amount of an accelerator pedal and a depression amount of a brake pedal, for example, may be used. Further, as the data relating to steering of the vehicle 12, data relating to a steering angle of a steering wheel, for example, may be used.

The driver's line-of-sight detection unit 82 detects the line-of-sight information of the driver. Specifically, the driver's line-of-sight detection unit 82 detects the line of sight of the driver based on the image of the face of the driver captured by the camera 38. A dedicated sensing device for detecting the line of sight may be provided separately from the camera 38.

The operator display unit 84 displays an operation status of the operator based on the remote operation signals received by the reception unit 72 at a position where the driver can visually check the operation status. For example, the operator display unit 84 displays the data relating to acceleration and deceleration included in the remote operation signals that are received by the reception unit 72 on the monitor provided on an instrument panel in a vehicle cabin. At this time, the operator display unit 84 may display the data in a display mode that is visually understandable by the driver. Similarly, the operator display unit 84 displays the data relating to steering input by the operator and the line-of-sight information of the operator on the monitor in a predetermined display mode.

The handover determination unit 86 determines that a driving operation of the vehicle 12 can be handed over to the remote operation. Specifically, the handover determination unit 86 determines that the driving operation of the vehicle 12 can be handed over to the remote operation when a difference between the drive data acquired by the drive data acquisition unit 80 and the remote operation signals received by the reception unit 72 is within a predetermined range. In the embodiment, for example, the handover determination unit 86 determines that the driving operation of the vehicle can be handed over to the remote operation when a difference between the acceleration and deceleration data acquired by the drive data acquisition unit 80 and the acceleration and deceleration signal received by the reception unit 72 is within a predetermined range, a difference between the steering data acquired by the drive data acquisition unit 80 and the steering signal received by the reception unit 72 is within a predetermined range, and a difference between the data of the line-of-sight information of the driver acquired by the drive data acquisition unit 80 and the signal of the line-of-sight information of the operator received by the reception unit 72 is within a predetermined range.

The notification unit 88 notifies the driver of a condition that allows handover of the driving operation of the vehicle 12 to the remote operation based on the difference between the drive data of the vehicle 12 and the remote operation signal in a state where the handover determination unit 86 does not make a determination that the driving operation of the vehicle 12 can be handed over to the remote operation. For example, this notification is performed using the display device, such as the monitor, provided in the vehicle 12 and via voice, for example.

Functional Configurations of Remote Operation Device 14

The remote operation device 14 that constitutes the remote operation system 10 realizes various functions using the hardware resources above. Functional configurations realized by the remote operation device 14 will be described with reference to FIG. 5. Each of the functional configurations is realized by the CPU 52 reading out and executing the program stored in the ROM 54 or the storage 58.

Figure 5:
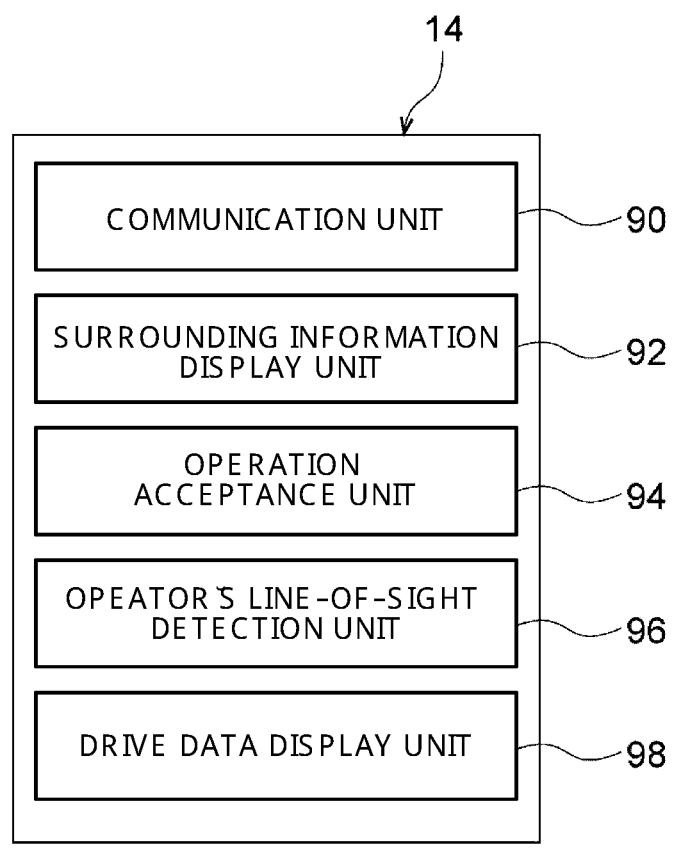
FIG. 5 is a block diagram showing an example of a functional configuration of the remote operation device.

As shown in FIG. 5, the remote operation device 14 is configured to include a communication unit 90, a surrounding information display unit 92, an operator's line-of-sight detection unit 96, and a drive data display unit 98 as functional configurations.

The communication unit 90 communicates with the vehicle 12 via the network 18. That is, the communication unit 90 receives the data from the vehicle 12 via the network 18. Further, the communication unit 90 transmits signals to the vehicle 12 via the network 18.

The surrounding information display unit 92 displays, on the display device 64, the surrounding information of the vehicle 12 that is transmitted to the remote operation device 14 using the function of the transmission unit 70 of the vehicle 12. Specifically, the display device 64 displays, for example, information on obstacles detected by the millimeter wave radar 40 and the laser radar 42 installed on the vehicle 12.

An operation acceptance unit 94 accepts the remote operation signals input to the input device 68 by the operator. The remote operation signals received by the operation acceptance unit 94 are transmitted to the vehicle 12 via the network 18 using the function of the communication unit 90.

The operator's line-of-sight detection unit 96 detects the line-of-sight information of the operator. Specifically, the operator's line-of-sight detection unit 96 detects the direction of line of sight of the operator based on the image of the face of the operator that is captured by the camera 69. A dedicated sensing device for detecting the line of sight may be provided separately from the camera 69.

The drive data display unit 98 displays the drive data of the vehicle 12. Specifically, the drive data display unit 98 receives the drive data acquired by function of the drive data acquisition unit 80 of the vehicle 12, and displays the operation status of the driver based on the drive data on the display device 64 that the operator can visually check the operation status, for example.

Effects

Next, the effect of the embodiment will be described.

Example of Handover Processing

Figure 6:
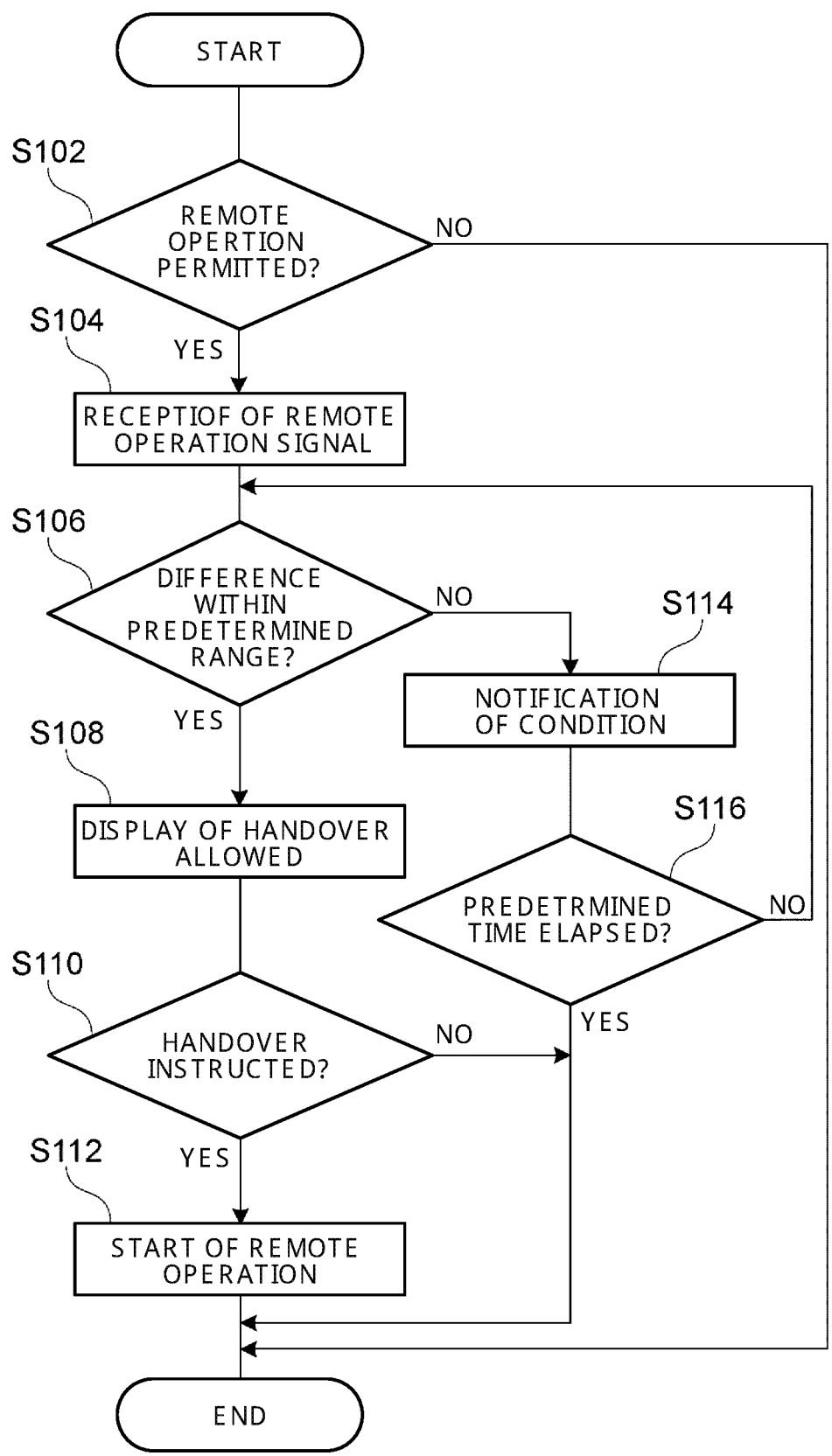
FIG. 6 is a flowchart showing an example of a flow of handover processing.

FIG. 6 is a flowchart showing an example of a flow of handover processing executed by the remote operation system 10. The CPU 24 executes the handover processing by reading out the remote operation program from the ROM 26 or the storage 30 and executing the program by deploying the remote operation program to the RAM 28. Further, the handover processing is periodically executed after a predetermined time.

As shown in FIG. 6, the CPU 24 determines in step S102 whether the remote operation is permitted. Specifically, the CPU 24 determines whether the remote operation by the remote operation device 14 outside the vehicle is permitted by the function of the permission unit 76. For example, the remote operation may be permitted by an operation of the driver.

The process proceeds to the step S104 when the CPU 24 determines that the remote operation is permitted in step S102. Further, the CPU 24 terminates the handover processing when the CPU 24 determines in step S102 that the remote operation is not permitted.

The CPU 24 receives the remote operation signals in step S104. That is, the CPU 24 receives the remote operation signals via the remote operation device 14 using the function of the reception unit 72. The remote operation signals are signals that are input to the input device 68 by the operator.

Next, the CPU 24 determines in step S106 whether the difference between the drive data and the remote operation signals is within the predetermined range. Specifically, the CPU 24 compares, using the function of the handover determination unit 86, the drive data acquired by the drive data acquisition unit 80 and the remote operation signals received by the reception unit 72. The CPU 24 determines that the difference between the drive data and the remote operation signals is within a predetermined range when the acceleration and deceleration data, the steering data, and the line-of-sight information data as the drive data are within the predetermined ranges with respect to the acceleration and deceleration signal, the steering signal, and the line-of-sight information signal as the remote operation signals, respectively.

When the CPU 24 determines in step S106 that the difference between the drive data and the remote operation signals is within the predetermined range, the process proceeds to step S108. Further, when the CPU 24 determines in step S106 that the difference between the drive data and the remote operation signals is deviated from the predetermined range, the process proceeds to step S114. The process in step S114 will be described later.

The CPU 24 displays that handover is possible in step S108. Specifically, the CPU 24 displays that handover is possible on the monitor provided in the vehicle cabin. As another method, a lamp may be provided in the vehicle cabin and the CPU 24 may notify the driver of a status that handover to the remote operation is possible by lighting the lamp.

Next, the CPU 24 determines in step S110 whether handover is instructed. That is, after the status that handover is possible is displayed in step S108, the CPU 24 determines that handover is instructed when the driver instructs handover by a predetermined operation. The driver may instruct handover by operating a button provided on the steering wheel and the instrument panel, for example. A voice input may be used to instruct handover.

The process proceeds to step S112 when the CPU 24 determines in step S110 that handover is instructed. The CPU 24 terminates the handover processing when handover is not instructed in step S110 and a predetermined time has elapsed.

The CPU 24 starts the remote operation in step S112. That is, the CPU 24 switches from the manual operation mode in which the vehicle 12 is driven by the driver based on the drive data to the remote operation mode in which the vehicle 12 travels based on the remote operation signals. In the remote operation mode, the vehicle 12 travels based on the remote operation signals received by the reception unit 72 using the function of the traveling control unit 78. The CPU 24 then terminates the handover processing.

On the other hand, the process proceeds to step S114 when the CPU 24 determines in step S106 that the difference between the drive data and the remote operation signals is deviated from the predetermined range. In step S114, the CPU 24 notifies the driver of the condition that allows handover of the driving operation of the vehicle 12 to the remote operation. Specifically, the CPU 24 notifies the driver of the condition that allows handover of the driving operation of the vehicle 12 to the remote operation based on the difference between the drive data and the remote operation signals by means of image and voice, etc., using the function of the notification unit 88.

For example, when the depression amount of the accelerator pedal by the driver is larger than that by the operator, a difference between the acceleration and deceleration data on the vehicle 12 side and the acceleration and deceleration signal on the remote operation device 14 side is detected. In this case, the CPU 24 may notify the driver so that the driver reduces the depression amount of the accelerator pedal.

For example, when the line of sight of the operator is directed forward on the contrary to the line of sight of the driver being directed in a direction other than the forward direction, a difference between the line-of-sight information of the driver and the line-of-sight information of the operator is detected. In this case, the CPU 24 may notify the driver so that the driver directs the line of sight in the forward direction of the vehicle.

Next, in step S116, the CPU 24 determines whether the predetermined time has elapsed. In the embodiment, as an example, when the difference between the drive data and the remote operation signals does not settle within the predetermined range until the predetermined time elapses since measurement of time starts after permission of the remote operation, the CPU 24 determines that the predetermined time has elapsed. The CPU 24 terminates the handover processing when the CPU 24 determines in step S116 that the predetermined time has elapsed. Further, the CPU 24 returns the process to step S106 when the CPU 24 determines in step S116 that the predetermined time has not elapsed.

As described above, in the remote operation system 10 of the embodiment, the CPU 24 determines that the driving operation of the vehicle can be handed over to the remote operation when the difference between the drive data input by the driver in the vehicle and the remote operation signals is within the predetermined range. As a result, even while the vehicle is traveling, the driving operation of the vehicle can be handed over from the driver in the vehicle to the operator outside the vehicle by determining, by the handover determination unit 86, that the driving operation of the vehicle can be handed over to the remote operation. That is, while the vehicle is traveling, the driving operation of the vehicle can be handed over from the driver in the vehicle to the operator outside the vehicle.

Further, the notification unit 88 notifies the driver of the condition that allows handover of the driving operation of the vehicle to the remote operation so that the driver can understand the condition that allows handover. Accordingly, it is possible to hand over the driving operation of the vehicle to the remote operation more promptly.

Further, the driver in the vehicle can check the operation status of the operator using the function of the operator display unit 84. As a result, the time required to reduce the difference between the drive data and the remote operation signals can be shortened.

Although the mode for carrying out the disclosure was described using the embodiment, the disclosure is not limited to the embodiment, and may be carried out in various forms without departing from the scope of the disclosure. For example, in the embodiment, the drive data includes the data relating to acceleration and deceleration of the vehicle, the data relating to steering, and the data including the line-of-sight information of the driver. However, the drive data is not limited to this. That is, the drive data may include at least one of the data relating to acceleration and deceleration of the vehicle, the data relating to steering, and the line-of-sight information of the driver, and need not include, for example, the line-of-sight information of the driver. The same applies to the remote operation signals.

Further, in the embodiment above, the notification unit 88 notifies the driver of the condition that allows handover to the remote operation based on the difference between the drive data of the vehicle 12 and the remote operation signals. However, activation of a drive assist function may be set as a condition that allows handover to the remote operation and the condition may be notified. For example, the notification may be made to the effect that handover is possible by turning on functions such as a lane keep assist and adaptive cruise control.

In particular, in a vehicle used for car rental, car sharing, etc., the driver may be notified of a button for activating the drive assist function and an operating method of the drive assist function.

Furthermore, in the embodiment described above, when handover to the remote operation is not completed within the predetermined time, the handover processing is terminated. However, the present disclosure is not limited to this. For example, a notification to prompt the driver to stop the vehicle 12 may be made. That is, when the driver stops the vehicle 12, the difference between the drive data and the remote operation signals can reliably fall within the predetermined range, which makes it possible to hand over the driving operation smoothly.

Further, various processors other than a CPU may execute the handover processing executed by the CPU 24 in the embodiment above by reading the software (program). The examples of the processor in this case include a programmable logic device (PLD) having a circuit configuration that can be changed after being manufactured, such as a field-programmable gate array (FPGA), and a dedicated electric circuit that is a processor having a circuit configuration that is exclusively designed for executing specific processes, such as an application specific integrated circuit (ASIC). Further, the handover processing may be executed by one of the various processors, or a combination of two or more processors of the same type or different types (for example, a plurality of FPGAs and a combination of a CPU and an FPGA). Further, more specifically, the hardware configurations of the processors above are electronic circuits in which circuit elements such as semiconductor devices are combined.

Furthermore, in the embodiment above, the storage 30 and the storage 58 are memory units. However, the present disclosure is not limited to this. For example, a recording medium such as a compact disk (CD), a digital versatile disk (DVD), and a universal serial bus (USB) memory may be used as the memory unit. In this case, the programs are stored in these recording media.

A vehicle according to a first aspect of the present disclosure includes a permission unit configured to permit a remote operation performed by a remote operation device provided outside the vehicle, a transmission unit configured to transmit surrounding information of the vehicle that is acquired by at least one sensing device to the remote operation device, a reception unit configured to receive a remote operation signal input by an operator outside the vehicle via the remote operation device, a traveling control unit configured to control the vehicle to travel based on the remote operation signal, a drive data acquisition unit configured to acquire drive data input by a driver in the vehicle, and a handover determination unit configured to determine, while the remote operation is permitted by the permission unit, that handover of a driving operation of the vehicle to the remote operation is allowed when a difference between the drive data acquired by the drive data acquisition unit and the remote operation signal is within a predetermined range.

In the vehicle according to the first aspect above, the permission unit permits the remote operation performed by the remote operation device. This makes it possible for the operator outside the vehicle to operate the vehicle remotely. Further, at this time, the operator can understand the surrounding information of the vehicle by causing the transmission unit to transmit the surrounding information of the vehicle acquired by the sensing device to the remote operation device. The reception unit of the vehicle receives the remote operation signal input by the operator, and the drive control unit controls the vehicle to travel based on the received remote operation signal.

The vehicle according to the first aspect above includes the drive data acquisition unit that acquires the drive data input by the driver in the vehicle and the handover determination unit that determines that the driving operation of the vehicle can be handed over to the remote operation. Here, the handover determination unit determines that handover is possible when the difference between the drive data and the remote operation signal is within the predetermined range. As a result, even while the vehicle is traveling, the driving operation of the vehicle can be handed over from the driver in the vehicle to the operator outside the vehicle by determining, by the handover determination unit, that the driving operation can be handed over.

In the first aspect above, the vehicle may further include a notification unit configured to notify the driver of a condition that allows the handover of the driving operation of the vehicle to the remote operation based on the difference between the drive data of the vehicle and the remote operation signal.

In the vehicle according to the above configuration, the driver can understand the condition that allows handover of the driving operation. As a result, the driving operation can be handed over to the remote operation more promptly.

In the first aspect above, the notification unit may be configured to notify the driver of the condition when the difference between the drive data and the remote operation signal is deviated from the predetermined range.

In the first aspect above, the vehicle may further include an operator display unit configured to display, at a position visually checkable by the driver, an operation status of the operator based on the remote operation signal received by the reception unit.

In the vehicle according to the above configuration, the driver in the vehicle can check the operation status of the operator. As a result, the time required to reduce the difference between the drive data and the remote operation signals can be shortened.

In the first aspect above, the drive data may include at least one of data relating to acceleration and deceleration of the vehicle, data relating to steering, and line-of-sight information of the driver, and the remote operation signal may include at least corresponding one of the data relating to acceleration and deceleration that is input to the remote operation device, the data relating to steering that is input to the remote operation device, and the line-of-sight information of the operator.

In the vehicle according to the above configuration, the handover determination unit determines that the driving operation of the vehicle can be handed over when the difference between at least one of the data relating to acceleration and deceleration, the data relating to steering, and the line-of-sight information of the driver in the drive data and at least corresponding one of data relating to acceleration and deceleration, data relating to steering, and the line-of-sight information of the operator in the remote operate signal is within the predetermined range.

A vehicle according to a second aspect of the present disclosure includes a processor configured to: permit a remote operation by a remote operation device provided outside the vehicle; transmit, to the remote operation device, surrounding information of the vehicle acquired by at least one sensing device; receive a remote operation signal input by an operator outside the vehicle via the remote operation device; control the vehicle to travel based on the remote operation signal; acquire drive data input by a driver in the vehicle; and determine, while the remote operation is permitted, that handover of a driving operation of the vehicle to the remote operation is allowed when a difference between the drive data acquired by the processor and the remote operation signal is within a predetermined range.

A remote operation system according to a third aspect of the present disclosure includes the vehicle according to the first aspect, and a remote operation device that is provided outside the vehicle and is configured to remotely control the vehicle.

In the remote operation system according to the third aspect above, the vehicle can be moved to a predetermined place by the remote operation based on the remote operation signal transmitted by the operator using the remote operation device.

As described above, with the vehicle according to the first aspect of the present disclosure and the remote operation system according to the second aspect of the present disclosure, the driving operation can be handed over from the driver in the vehicle to the operator outside the vehicle.

What is claimed is:

1. A vehicle comprising a processor configured to execute the steps of:
   permitting a remote operation performed by a remote operation device provided outside the vehicle;
   transmitting surrounding information of the vehicle that is acquired by at least one sensing device to the remote operation device;
   receiving a remote operation signal input by an operator outside the vehicle via the remote operation device;
   controlling the vehicle to travel based on the remote operation signal;
   acquiring drive data input by a driver in the vehicle; and
   determining, while the remote operation is permitted by the permission unit, that handover of a driving operation of the vehicle to the remote operation is allowed when a difference between the drive data acquired in the acquiring step and the remote operation signal is within a predetermined range,
   wherein the drive data includes data relating to acceleration and deceleration of the vehicle, data relating to steering, and line-of-sight information of the driver, and
   the remote operation signal includes corresponding data relating to acceleration and deceleration that is input to the remote operation device, data relating to steering that is input to the remote operation device, and line-of-sight information of the operator.

2. The vehicle according to claim 1, wherein the processor is further configured to execute the step of notifying the driver of a condition that allows the handover of the driving operation of the vehicle to the remote operation based on the difference between the drive data of the vehicle and the remote operation signal.

3. The vehicle according to claim 2, further comprising a display configured to display, at a position visually checkable by the driver, an operation status of the operator based on the remote operation signal received in the receiving step.

4. The vehicle according to claim 3, wherein the notifying step includes notifying the driver of the condition when the difference between the drive data and the remote operation signal is deviated from the predetermined range.

5. The vehicle according to claim 2, wherein the notifying step includes notifying the driver of the condition when the difference between the drive data and the remote operation signal is deviated from the predetermined range.

6. The vehicle according to claim 1, further comprising a display configured to display, at a position visually checkable by the driver, an operation status of the operator based on the remote operation signal received in the receiving step.

7. The vehicle according to claim 1, wherein the processor is further configured to execute the step of notifying the driver of a condition that allows the handover of the driving operation of the vehicle to the remote operation based on the difference between the drive data of the vehicle and the remote operation signal when the difference between the drive data and the remote operation signal is deviated from the predetermined range.

8. A vehicle comprising a processor configured to:
   permit a remote operation by a remote operation device provided outside the vehicle;
   transmit, to the remote operation device, surrounding information of the vehicle acquired by at least one sensing device;
   receive a remote operation signal input by an operator outside the vehicle via the remote operation device;
   control the vehicle to travel based on the remote operation signal;
   acquire drive data input by a driver in the vehicle; and
   determine, while the remote operation is permitted, that handover of a driving operation of the vehicle to the remote operation is allowed when a difference between the drive data acquired by the processor and the remote operation signal is within a predetermined range,
   wherein the drive data includes data relating to acceleration and deceleration of the vehicle, data relating to steering, and line-of-sight information of the driver, and
   the remote operation signal includes corresponding data relating to acceleration and deceleration that is input to the remote operation device, data relating to steering that is input to the remote operation device, and line-of-sight information of the operator.

9. The vehicle according to claim 8, wherein the processor is configured to notify the driver of a condition that allows the handover of the driving operation of the vehicle to the remote operation based on the difference between the drive data of the vehicle and the remote operation signal.

10. The vehicle according to claim 9, wherein the processor is configured to notify the driver of the condition when the difference between the drive data and the remote operation signal is deviated from the predetermined range.

11. The vehicle according to claim 9, wherein the processor is configured to display, at a position visually checkable by the driver, an operation status of the operator based on the remote operation signal received by the processor.

12. The vehicle according to claim 9, wherein:
the drive data includes at least one of data relating to acceleration and deceleration of the vehicle, data relating to steering, or line-of-sight information of the driver; and
the remote operation signal includes at least corresponding one of data relating to acceleration and deceleration that is input to the remote operation device, data relating to steering that is input to the remote operation device, and line-of-sight information of the operator.

13. The vehicle according to claim 8, wherein the processor is configured to display, at a position visually checkable by the driver, an operation status of the operator based on the remote operation signal received by the processor.

14. The vehicle according to claim 8, wherein:
the drive data includes at least one of data relating to acceleration and deceleration of the vehicle, data relating to steering, or line-of-sight information of the driver; and
the remote operation signal includes at least corresponding one of data relating to acceleration and deceleration that is input to the remote operation device, data relating to steering that is input to the remote operation device, and line-of-sight information of the operator.

15. A remote operation system comprising a vehicle including:
a processor configured to execute the steps of:
permitting a remote operation performed by a remote operation device provided outside the vehicle,
transmitting surrounding information of the vehicle that is acquired by at least one sensing device to the remote operation device,
receiving a remote operation signal input by an operator outside the vehicle via the remote operation device,
controlling the vehicle to travel based on the remote operation signal,
acquiring drive data input by a driver in the vehicle, and
determining, while the remote operation is permitted by the permission unit, that handover of a driving operation of the vehicle to the remote operation is allowed when a difference between the drive data acquired in the acquiring step and the remote operation signal is within a predetermined range; and
a remote controller that is provided outside the vehicle and is configured to remotely control the vehicle,
wherein the drive data includes data relating to acceleration and deceleration of the vehicle, data relating to steering, and line-of-sight information of the driver, and
the remote operation signal includes corresponding data relating to acceleration and deceleration that is input to the remote operation device, data relating to steering that is input to the remote operation device, and line-of-sight information of the operator.

* * * * *